United States Patent [19]

Pagliaroli et al.

[11] Patent Number: 5,276,728
[45] Date of Patent: Jan. 4, 1994

[54] REMOTELY ACTIVATED AUTOMOBILE DISABLING SYSTEM

[76] Inventors: Kenneth Pagliaroli; Dean Pagliaroli, both of 140 George St., South Amboy, N.J. 08879

[21] Appl. No.: 788,508

[22] Filed: Nov. 6, 1991

[51] Int. Cl.$^5$ .................. H04M 11/00; B60R 25/04; B60R 25/00; B60R 25/10
[52] U.S. Cl. .................... 379/58; 379/59; 70/243; 180/287; 307/10.3; 307/10.5; 340/426; 340/539; 455/54.2
[58] Field of Search ............ 379/56, 58, 59, 37, 379/39, 42, 44; 70/243, 654; 340/539, 426, 429; 180/167, 169, 287; 307/10.3, 10.5, 10.4; 455/54.2

[56] References Cited

U.S. PATENT DOCUMENTS

| | | | |
|---|---|---|---|
| 3,646,515 | 2/1972 | Vodehnal | 307/10.3 |
| 3,665,312 | 5/1972 | Jarvis | 455/54.2 |
| 3,968,666 | 7/1976 | MacKinnon | 70/243 |
| 3,987,408 | 10/1976 | Sassover et al. | 340/64 |
| 4,067,411 | 1/1978 | Conley et al. | 180/169 |
| 4,159,467 | 6/1979 | Ballin | 307/10.5 |
| 4,218,763 | 8/1980 | Kelley et al. | 340/429 |
| 4,523,178 | 6/1985 | Fulhorst | 340/426 |
| 4,665,379 | 5/1987 | Howell et al. | 340/426 |
| 4,673,921 | 6/1987 | Saito et al. | 340/539 |
| 4,691,801 | 9/1987 | Man et al. | 180/287 |
| 4,740,755 | 4/1988 | Price | 340/429 |
| 4,884,055 | 11/1989 | Memmola | 340/426 |
| 4,887,064 | 12/1989 | Drori et al. | 340/426 |
| 4,904,983 | 2/1990 | Mitchell | 340/426 |
| 5,081,667 | 1/1992 | Drori et al. | 379/59 |
| 5,140,308 | 8/1992 | Tanaka | 340/539 |

OTHER PUBLICATIONS

Radio Shack, 1988 Catalog, pp. 63 and 115.
Inbound/Outbound Magazine, p. 70, Oct. 1989.
Radio Shack, 1990 Catalog, p. 64.

*Primary Examiner*—Jin F. Ng
*Assistant Examiner*—William D. Cumming
*Attorney, Agent, or Firm*—Arthur L. Plevy

[57] ABSTRACT

A system for remotely disabling or enabling an automobile having at least one receiver that scans signal codes transmitted in frequencies dedicated to mobile telephone communications, and at least one frequency outside that used in mobile telephone communications. The signal codes received by the receiver are compared to an enabling code and a disabling code stored within a programmable memory. When the owner of an automobile finds the vehicle stolen, the owner dials the telephone number corresponding to the disabling code of the automobile. The dialed number causes a signal code to be transmitted from the mobile telephone transmitted network, wherein the signal code is received by the stolen automobile. If the transmitted signal code matches the programmed disabling code the automobile is disabled. Similarly, the automobile can be enabled if a signal code is received that matches the enabling code the automobile. The signal code corresponding to the disabling and enabling codes for the automobile can also be transmitted on a frequency not used in mobile telephone communications by portable transmitters carried by police. As such, a stolen automobile can be selectively disabled by police if located.

10 Claims, 2 Drawing Sheets

REMOTELY ACTIVATED AUTOMOBILE DISABLING SYSTEM

FIELD OF THE INVENTION

The present invention relates to remotely operated system for disabling an automobile, and more particularly to such systems that allow either the owner of a vehicle or the police to selectively disable a vehicle after it has been stolen or otherwise misappropriated.

BACKGROUND OF THE INVENTION

Automobile theft is a very common crime, resulting in higher automobile insurance rates for all drivers. Each year newer and more sophisticated anti-theft devices are manufactured in the hope that these devices will prevent the theft of some automobiles. Unfortunately, automobile thieves adapt quickly. No sooner has a new anti-theft device been developed, than an automobile thief has thought of a way to disable or circumvent the anti-theft device and steal the automobile.

Many stolen automobiles are stolen for profit, wherein the automobiles are sold by the thieves or the automobile is stripped of its valuable component parts. However, some automobiles are stolen for alternative motives such as "joy riding" or the automobile may be used in the commission of another crime.

When an automobile is stolen, the owner of the vehicle usually reports the theft to police. The description of the automobile and its license plate number are then identified in the police records as being a stolen vehicle. Often police locate the stolen vehicle while it is still in the possession of the automobiles thieves. If the automobile is being driven when it is identified by police, the thieves may try to outrun the pursuant police, resulting in a dangerous high speed chase.

The present invention system helps to both prevent automobile thefts and prevent high speed chases by allowing both the owner of the automobile and the police to disable the automobile remotely after it is stolen. Since the disabling device is not activated until after the car is stolen, thieves do not know that the disabling device is present and do not attempt to disconnect the system when they are stealing the automobile. After an automobile is stolen the owner may not realize that his/her automobile has been stolen until the automobile is many miles away. The present invention system utilized mobile telephone technology to deactivate the stolen automobile. With such a system the owner of the car need only dial the disabling code for the automobile into a phone and the code will be transmitted to all points within the mobile telephone cellular region, which may encompass hundreds of square miles. If the automobile is first found by police, the police may disable the automobile by dialing the same disabling code into a telephone. Alternatively, the police may also transmit the disabling code from small transmitters carried in the police cars. This would allow the police to selectively disable a car, involved in a high speed chase, at a point most opportune to prevent injury and/or property damage.

Remote controlled devices that disable an automobile are in common use. The most typical device is incorporated into an alarm system, wherein the owner of the vehicle has a low power, short range transmitter that disables the car and activates an alarm. Such systems are exemplified in U.S. Pat. Nos. 4,691,801 to Mann, et al.; 4,159,467 to Ballin; 3,987,408 to Sassover, et al.; and 4,740,775 to Price. With all of these devices the thief will know the car is disabled as the thief is stealing the car, giving the thief an opportunity to circumvent the device.

High powered, long distance disabling devices that do not disable an automobile until after it is stolen are exemplified in U.S. Pat. No. 4,067,411 to Conley, et al. In such device the automobile that has been stolen responds to a signal transmitted from a central transmitter. The automobile then disables itself if it is in the range of the transmitter. With such disabling systems the range is limited and the individual owner cannot disable the automobile. Similarly, the police must also use the central transmitter and cannot selectively disable the automobile at will.

Many anti-theft devices also place transmitters into automobiles. With such a system, the automobile can remotely alert the owner that the automobile is being stolen, or may transmit a signal so that the police may locate the automobile. Examples of such systems are shown in U.S. Pat. Nos. 4,673,921 to Saito et al; 4,523,178 to Fulhorst; 4,218,763 to Kelly et al; 3,665,312 to Jarvis: and 3,646,515 to Vodehnal. With such transmitting devices the owner or police can track the location of a stolen vehicle but cannot selectively disable the car at an unknown location.

It is therefore an object of the present invention to create a remotely activated automobile disabling device wherein an owner of a vehicle can dial a disabling code into a telephone and disable the vehicle at any point within the range of a mobile telephone network. Additionally, the police can selectively transmit the disabling code from transmitters within their squad cars, disabling stolen cars that may be involved in the commission of a crime or a high speed chase.

SUMMARY OF THE INVENTION

The present invention system provides a system through which a stolen, or otherwise misappropriated, vehicle ca be remotely disabled by either its owner or the police. Stated in general terms, the present invention includes a receiver that is activated by theft detection sensors when the automobile is stolen. Once activated the receiver monitors the signal frequency range currently used to transmit mobile telephone communications. Once the owner of the automobile discovers that the automobile has been stolen, the operator dials a predetermined telephone number corresponding to the receiver. The number is then transmitted from the signal towers of the mobile telephone network in use. The receiver receives the transmitted signal and compares it to a disabling code and an enabling code stored within the receiver. If the transmitted signal matches the disabling code, the automobile is disabled. Similarly, if the transmitted signal matches the enabling code, a disable automobile will be enabled and can resume normal use.

The enabling and disabling codes can also be transmitted over short distances by portable transmitters carried in police vehicles. The portable transmitters allow the police to selectively disable a vehicle at an opportune moment, if the vehicle is involved in the commission of a crime or a high speed chase. Similarly, the portable transmitters allow police to enable cars that have been disabled in traffic by the owner of the vehicle.

The present invention system optionally comes equipped with a transmitter. The transmitter can signal a portable receiver, carried by the owner of an automobile, informing the owner that the vehicle is being tampered with or stolen.

BRIEF DESCRIPTION OF THE FIGURES

For a better understanding of the present invention, reference is made to the following description of an exemplary embodiment thereof, considered in connection with the accompanying drawings, in which.

DETAILED DESCRIPTION OF THE DRAWINGS

Although the present invention can be used to remotely disable any motor vehicle, such as tractor trailers, motorcycles and the like, it is especially suitable for use in passenger automobiles. Accordingly, the present invention will be described in connection with a passenger automobile.

Most factory equipped automobiles are not manufactured with an integral anti-theft alarm system. However, most passenger automobiles do have certain circuits that can act as theft detection sensors. For example, most automobiles have courtesy lights that light whenever a door of the automobile is opened, or a trunk lamp that lights when the trunk is opened. When an anti-theft alarm system is installed on an automobile, it is common to couple the alarm system to these existing circuits. As such, the courtesy light and trunk lamp switches of an automobile act as anti-theft sensors for the newly installed alarm system. Alarm systems may also add new anti-theft sensors, such as vibration detectors and sound detectors. The combination of existing circuitry and new anti-theft sensors combine to give the greatest theft detecting protection possible to an automobile.

Figure 1:
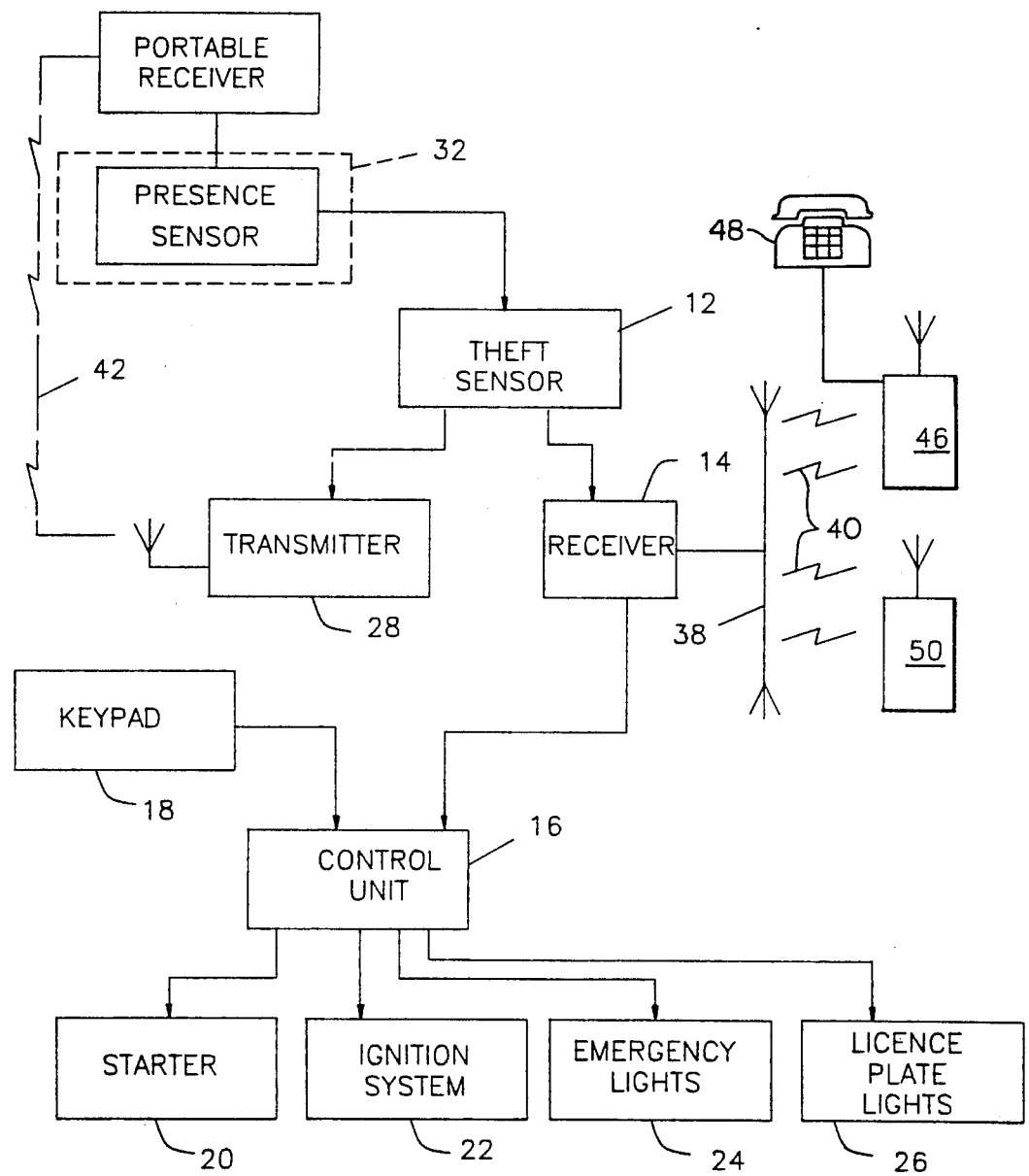
FIG. 1 is a block diagram illustrating the operation of the present invention remote disabling system.

The adaption of anti-theft alarm systems to existing automobile circuits and other tampering detection devices is well known in the art. As such, the circuitry involved in triggering an anti-theft alarm system is not be set forth herein at length. Referring to FIG. 1, the automobile circuits and other well known devices commonly used to trigger anti-theft alarms are referred to herein as theft sensors 12 and are assumed to be part of the automobile on which the present invention system is to be installed.

With the theft sensors 12 in place, a receiver 14, control unit 16, and a means for accessing the control unit 16, such as a keypad 18, are added to the automobile. The control unit 16 is coupled to either the electrical circuits or the electromechanical components that selectively control the operation of the starter 20, ignition system 22 and emergency lights 24. Optionally, the control unit 16 may also be coupled to an externally visible device such as the lights 26 surrounding the license plate. The controlled activation and deactivation of such electrical circuits and electromechanical components, by a central control unit, is a technology that is well known in the art of automobile anti-theft devices.

Optionally, a transmitter 28 and a portable receiver device 30 may be added to the automobile. The portable receiver device 30 would be located within the automobile so as to be easily accessed and removed by the automobile's operator. Preferably the portable receiver device 30 would be positionable with a receptacle 32, dedicated within the automobile to hold the portable receiver device 30. The receptacle 32 has a presence sensor 34 located within it that detects whether the portable receiver device 30 is present within the receptacle 32 or has been removed by the operator of the automobile.

Figure 2:
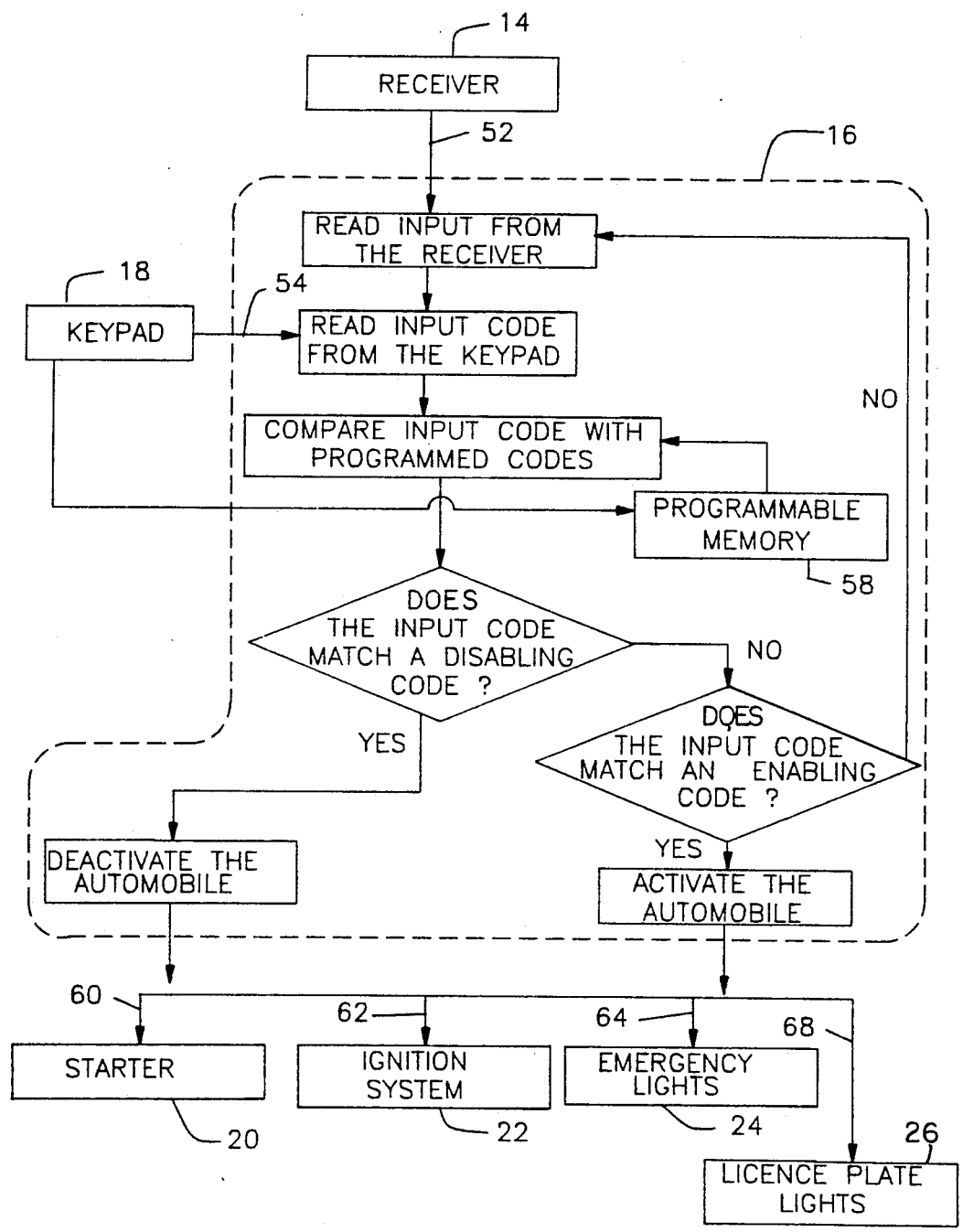
FIGS. 2 is a block diagram illustrating the operation of the control unit as referenced in FIG. 1.

Referring to FIGS. 1 and 2, the operation of the present invention remote disabling system can be described. When the operator of the automobile is leaving the automobile, the operator removes the portable receiver device 30 from its receptacle 32 and takes the portable receiver device 30 with him or her. The removal of the portable receiver device 30 from the receptacle 32 triggers the presence sensor 34, which enables the theft sensors 12. If the portable receiver device 30 were not part of the present invention system, the theft sensors 23 could be enabled from a toggle switch, the removal of the key from the ignition or any other well known means through which automobile alarm systems are activated.

The theft sensors 12 monitor the condition of the automobile. If triggered by theft or tampering, the theft sensor 12 enables the receiver 14. The receiver 14 is coupled to an antenna 38 so as to receive signal codes 40 from a source external of the automobile. The receiver 14 may take several forms. The receiver 14 may be hidden from view and may be coupled to an antenna 38 that is also hidden from view. Hidden components prevent thieves from disabling the receiver 14 by damaging the receiver 14 itself or the antenna 38 coupled to the receiver 14. In alternate embodiments the receiver 14 may be part of a mobile telephone that has been previously installed in the automobile. In such an embodiment the receiver 14 would be obvious and be coupled to the antenna 14 dedicated to the mobile telephone. However, thieves would not consider a mobile telephone as an anti-theft device and would not damage either the telephone receiver unit or the antenna because both are valuable commodities to a thief. Regardless, to the embodiment of the receiver 14 and the antenna 38, the receiver 14 scans the frequency range of mobile telephone transmissions, which is in the range of 900 MHz. The signal codes 40 received by the receiver 14 are forwarded to the control unit 16.

The theft sensors 12 are optionally coupled to a transmitter 28. Once activated the transmitter 28 transmits a signal 42 that can be received by the portable receiver device 30. The portable receiver device 30 then generates an audio and/or visual signal that informs a person in possession of the portable receiver device 30 of the tampering or attempted theft of the automobile.

The receiver 14 can receive a signal code 40 from one of two sources. First, the signal code 40 may come from mobile telephone signal transmitter 46 operating in the area of the automobile. Such mobile telephone signal transmitters 46 are now commonplace in populated areas and are easily accessed. Mobile telephone signal transmitters 46 are often parts of larger mobile telephone networks, often called "cellular networks" that transmit signals across thousands of square miles and many encompass several states. A signal code 40 is transmitted to the receiver 14 as if the receiver 14 were a common mobile telephone unit. The transmission of a dialed code to a specific mobile telephone being a well known technology in the art of telecommunications. To transmit the signal code 40, a person, by using any telephone 48, need only dial the phone number of the receiver 14. The local mobile telephone company would transmit the signal code 40, associated with the telephone number dialed, through its network of mobile telephone signal transmitters 46. If the stolen vehicle were in the range of the mobile telephone transmitter network, the receiver 14 would receive the signal code 40.

If the receiver 14 were embodied in an actual mobile telephone unit, the signal code 40 may encompass the actual phone number of the mobile telephone plus an additional signal code that distinguished an automobile disabling code from a common mobile telephone incoming call signal. If the receiver 14 were a dedicated unit only the disabling code need be transmitted.

The second source through which a signal code 40 may be transmitted to the receiver 14 is through a short range portable transmitter 50. Such a transmitter 50 may be carried by a policeman or in a police car and transmits a signal code 40 directly to the receiver 14 without the need of the cellular phone signal transmitter 46. Such a short range transmitter 50 may transmit in the same frequency range as mobile telephone transmitters or may be transmitted along a differing dedicated frequency. If the short range transmitter 50 does not transmit in the mobile telephone frequency range then obviously the receiver 14 must also scan signals from the selected dedicated frequency in addition to mobile telephone frequencies.

Referring to FIG. 2, the details of the control unit 16 are shown. The signal code 40 received by the receiver 14 by either the mobile telephone signal transmitter 46 or the police transmitter 50, is forwarded to the control unit 16. Additionally, an input code 54 may be entered through the keypad 18 within the automobile. The control unit 16 reads both the input code 52 from the receiver 14 and the input code 54 from the keypad 18.

A memory source 58, such as an integrated memory circuit, is integrally formed as part of the control unit 16. Stored within the memory source 58 is the code for enabling the automobile and a code for disabling the automobile. Both stored codes may be fixed at the time of manufacture or may be programmable utilizing the input variables located on the keypad 18.

The control unit 16 recalls the enabling and disabling code from the memory source 58 and compares the recalled codes with input code read from the receiver 14 or the keypad 18. If the input code matches the disabling code, disabling signals 60, 62 are sent to the starter 20 and ignition system 22, respectively, stopping the operation of the automobile and preventing the automobile from being restarted. Simultaneously, a control signal 64 is sent to the emergency lights 24 of the automobile, activating the lights and warning surrounding traffic of the disabled nature of the automobile. Optionally, a second control signal 68 may be sent to the license plate lights 26, changing the color or flashing the license plate lights 26 so as to identify to passing police that the disabled automobile is stolen.

Alternatively, the license plate lights 26 may be altered by the control unit 16 as soon as the theft sensors 12 are activated on the automobile. In this way the license plate lights 26 can indicate to police that the car is stolen before the automobile is disabled. This allows police to identify and track the stolen automobile, disabling it at the most opportune moment.

After the automobile has been disabled and recovered, the automobile can be selectively enabled by transmitting an enabling code from the mobile telephone transmitter 46, the portable police transmitter 50 or imputing the enabling code directly into the keypad 18. If the enabling code matches the enabling code programmed into the memory source 58 of the control unit 16, the automobile will revert back into a normal operating condition.

The block diagrams of FIGS. 1 and 2 show the control unit 16 as a separate component from the receiver 14 and the keypad 18. It should be obvious to a person skilled in the art that these components may share circuitry or be integrally formed. For example, if the receiver 14 is part of a mobile telephone unit then many features of the control unit 16, such as reading transmitted input codes and comparing those codes with codes stored in a memory, would already exist as part of the mobile telephone. Similarly, the dial pad of the mobile telephone could act as the keypad 18, eliminating the need for a separate keypad 18.

It should be understood that the embodiment described herein is merely exemplary and that a person skilled in the art may make variations and modifications without departing from the spirit and scope of the invention. More specifically, many prior art devices exist for activating automobile anti-theft alarms. All such devices are intended to be included herein and the present invention need not be limited to the theft sensors specifically described. Similarly, the embodiment described herein shows a disabling connection to the started and ignition system of the automobile. The scope of the invention need not be limited to these systems and other systems such as fuel supply, air supply, brakes and transmission may be disabled with, or disabled in place of, the systems specifically detailed. The means through which such systems may be disabled being known through prior art. All such variations and modifications are intended to be included within the scope of the invention as defined by the appended claims.

What is claimed is:

1. A security system for a vehicle, comprising:

arming means for selectively enabling and disabling said vehicle security system, wherein said arming means includes a receptacle disposed to receive a transportable receiver within said vehicle, said arming means enabling said security system when said transportable receiver is removed from said receptacle and disabling said security system when said transportable receiver is placed within said receptacle;

at least one theft sensor for producing an trigger signal when the vehicle is tampered with;

a transmitter means, coupled to said at least one theft sensor, for transmitting an alarm signal when said transmitter receives said trigger signal from said at least one theft sensor, whereby said alarm signal is received by said transportable receiver and said transportable receiver produces an audible alarm in response to said alarm signal;

at least one receiving means coupled to said at least one theft sensor, wherein said at least one receiving means is enabled upon receipt of said trigger signal, said receiving means capable of receiving control signals from a range of frequencies, use in mobile telephone communications, and at least one dedicated frequency outside of said range of frequencies;

memory means containing at least one enabling code and at least one disabling code;

comparison means for comparing control signals received by said at least one receiving means to said at least one enabling code and disabling code; and vehicle control means for disabling said vehicle when said control signals match said at least one disabling code and enabling said vehicle when said control signals match said at least one enabling code.

2. The system according to claim 1, further including a variable input means, coupled to said memory means, through which said at least one disabling code and said at least one enabling code can be selectively entered into said memory means.

3. The system according to claim 1, wherein said variable input means is coupled to said comparison means, whereby a code input through one disabling code, and said vehicle control means disables said vehicle when said code matches said at least one disabling code and enables said vehicle when said code matches said at least one enabling code.

4. The system according to claim 3, wherein said at least one receiving means is part of a mobile telephone device preinstalled in said vehicle.

5. The system according to claim 4, wherein said variable input means includes a dialing keypad contained within said mobile telephone device.

6. The system of claim 1, wherein said vehicle includes an ignition system and said vehicle control means controls the operation of the ignition system.

7. The system of claim 6, wherein said vehicle includes a starter and said vehicle control means controls the operation of the starter for said vehicle.

8. The system of claim 1, wherein said vehicle includes emergency lights and said vehicle control means controls the operation of the emergency lights for said vehicle.

9. The system of claim 1, further including a signaling means for producing a visible signal on said vehicle when said at least one receiving means is enabled by said trigger signal.

10. The system of claim 9, wherein said vehicle includes license plate lights and said signalling means controls the license plate lights.

* * * * *